United States Patent
Chew

(10) Patent No.: US 6,700,731 B2
(45) Date of Patent: Mar. 2, 2004

(54) IN-SITU LINEARIZATION OF MAGNETIC READ/WRITE HEAD TRANSDUCER POSITION ERROR SIGNAL

(75) Inventor: Kok-Kia Chew, Fremont, CA (US)

(73) Assignee: Samsung Electronics Co., Inc. (KR)

( * ) Notice: Subject to any disclaimer, the term of this patent is extended or adjusted under 35 U.S.C. 154(b) by 400 days.

(21) Appl. No.: 09/872,700

(22) Filed: May 31, 2001

(65) Prior Publication Data

US 2003/0026036 A1 Feb. 6, 2003

(51) Int. Cl.[7] .............................................. G11B 5/596
(52) U.S. Cl. ................... 360/77.08; 360/77.04
(58) Field of Search ........................ 360/77.08, 77.04, 360/77.05, 78.04, 48

(56) References Cited

U.S. PATENT DOCUMENTS

| | | | |
|---|---|---|---|
| 4,371,902 A | * | 2/1983 | Baxter et al. |
| 4,539,662 A | * | 9/1985 | Hatano et al. |
| 4,628,380 A | * | 12/1986 | Quackenbush ........... 360/78.08 |
| 4,802,033 A | * | 1/1989 | Chi |
| 4,811,135 A | * | 3/1989 | Janz |
| 4,823,212 A | * | 4/1989 | Knowles et al. |
| 4,890,172 A | * | 12/1989 | Watt et al. |
| 4,977,472 A | * | 12/1990 | Volz et al. |
| 4,982,295 A | * | 1/1991 | Yakuwa et al. |
| 5,036,408 A | * | 7/1991 | Leis et al. |
| 5,053,899 A | * | 10/1991 | Okawa et al. |
| 5,170,299 A | * | 12/1992 | Moon ....................... 360/77.08 |
| 5,210,662 A | * | 5/1993 | Nishijima |
| 5,227,930 A | * | 7/1993 | Thanos et al. ........... 360/78.04 |
| 5,235,478 A | * | 8/1993 | Hoshimi et al. |
| 5,255,136 A | * | 10/1993 | Machado et al. |
| 5,333,140 A | * | 7/1994 | Moraru et al. |
| 5,400,201 A | * | 3/1995 | Pederson .................... 360/135 |
| 5,408,367 A | * | 4/1995 | Emo |
| 5,448,429 A | * | 9/1995 | Cribbs et al. |
| 5,450,249 A | * | 9/1995 | Nagaraj et al. |
| 5,452,285 A | | 9/1995 | Monen |
| 5,453,887 A | * | 9/1995 | Negishi et al. |
| 5,500,776 A | | 3/1996 | Smith |
| 5,523,902 A | | 6/1996 | Pederson |
| 5,570,247 A | * | 10/1996 | Brown et al. |
| 5,576,906 A | * | 11/1996 | Fisher et al. ............. 360/77.08 |
| 5,581,420 A | * | 12/1996 | Chainer et al. |
| 5,587,850 A | * | 12/1996 | Ton-that .................. 360/77.08 |

(List continued on next page.)

FOREIGN PATENT DOCUMENTS

| | | | |
|---|---|---|---|
| EP | 0 601 855 A2 | * | 6/1994 |
| EP | 0 663 766 A1 | * | 7/1995 |
| EP | 0 717 559 A2 | * | 6/1996 |
| EP | 0 718 827 A2 | * | 6/1996 |
| GB | 2 285 165 A | * | 6/1995 |
| GB | 2 307 089 A | * | 5/1997 |
| GB | 2 308 488 A | * | 6/1997 |
| WO | WO 95/24035 | * | 9/1995 |
| WO | WO 96/23305 | * | 8/1996 |

Primary Examiner—David Hudspeth
Assistant Examiner—Fred F. Tzeng
(74) Attorney, Agent, or Firm—Irell & Manella LLP; Jeffrey P. Aiello

(57) ABSTRACT

A method, apparatus, and computer program product for linearizing a position error signal of a transducer in a hard disk drive. In one embodiment, a disk including a first plurality of tracks each includes first and second servo bursts defining a track reference line, and a second plurality of the first plurality of tracks on the disk each includes third and fourth servo bursts defining a second plurality of different position offsets from the track reference line of the second plurality of tracks. Each of the second plurality of different position offsets being at a different value than any other position offset. The second plurality is no greater than the first plurality. The second plurality of different position offsets are used for linearizing a position error signal.

20 Claims, 8 Drawing Sheets

U.S. PATENT DOCUMENTS

| | | | |
|---|---|---|---|
| 5,600,506 A | | 2/1997 | Baum et al. |
| 5,602,693 A | | 2/1997 | Brunnett et al. |
| 5,606,469 A | * | 2/1997 | Kosugi et al. |
| 5,608,587 A | * | 3/1997 | Smith |
| 5,615,058 A | * | 3/1997 | Chainer et al. |
| 5,631,783 A | | 5/1997 | Park |
| 5,640,423 A | | 6/1997 | Archer |
| 5,659,436 A | | 8/1997 | Yarmchuk et al. |
| 5,666,238 A | | 9/1997 | Igari et al. |
| 5,680,270 A | | 10/1997 | Nakamura |
| 5,680,451 A | | 10/1997 | Betts et al. |
| 5,691,857 A | | 11/1997 | Fitzpatrick et al. |
| 5,710,677 A | | 1/1998 | Teng et al. |
| 5,715,105 A | | 2/1998 | Katayama et al. |
| 5,726,823 A | | 3/1998 | Kisaka et al. |
| 5,734,680 A | | 3/1998 | Moore et al. |
| 5,748,677 A | | 5/1998 | Kumar |
| 5,771,126 A | | 6/1998 | Choi |
| 5,771,130 A | | 6/1998 | Baker |
| 5,771,131 A | | 6/1998 | Pirzadeh |
| 5,781,361 A | | 7/1998 | Le et al. |
| 5,796,543 A | | 8/1998 | Ton-That |
| 5,798,883 A | | 8/1998 | Kim |
| 5,825,580 A | | 10/1998 | Shibata |
| 5,867,337 A | | 2/1999 | Shimomura |
| 5,867,353 A | | 2/1999 | Valent |
| 5,892,634 A | | 4/1999 | Ito et al. |
| 5,917,670 A | | 6/1999 | Scaramuzzo et al. |
| 5,946,157 A | | 8/1999 | Codilian et al. |
| 5,986,847 A | | 11/1999 | Le et al. |
| 6,008,962 A | | 12/1999 | Le et al. |
| 6,057,977 A | | 5/2000 | Cunningham |
| 6,262,859 B1 | | 7/2001 | Cho |
| 6,388,829 B1 | | 5/2002 | Nazarian |
| 6,611,397 B1 | * | 8/2003 | Nguyen .................. 360/77.08 |

* cited by examiner

IN-SITU LINEARIZATION OF MAGNETIC READ/WRITE HEAD TRANSDUCER POSITION ERROR SIGNAL

BACKGROUND OF THE INVENTION

1. Field of the Invention

The present invention relates generally to disk drives and more particularly to a method, apparatus, and computer readable program product for linearizing read/write head position error signals.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately located relative to the centerline of the track. The signals produced by the servo bits are typically demodulated into position offset signals which are used to determine the position of the head relative to the track, and to move the actuator arm if the head is not located on the track centerline.

Dual element transducers are increasingly utilized in hard disk drives because they are lighter than single element transducers. Dual element transducers include a single write element and a separate read element which is constructed from a magneto-resistive material. Such dual element transducers are commonly referred to as magneto-resistive (MR) heads.

Because of manufacturing tolerances, the separate magneto-resistive read element may be off-center from the write element of the head. Therefore, if data is written off the center of the track, to read the data, the servo system must move the head slightly off-center so that the read element is centered with the written data.

It also has been determined that the skew offset information for an MR head located over the inner tracks of a disk is different from that of an MR head located over the outer tracks of a disk. In addition, such MR head skew offset information is typically non-linear, and it also generally varies greatly between heads.

BRIEF SUMMARY OF THE INVENTION

The present invention comprises a method, apparatus, and computer program product for linearizing a position error signal of a transducer in a hard disk drive. In one embodiment, a method includes providing a disk that includes a first plurality of tracks each having first and second servo bursts defining a track reference line of the respective tracks. A second plurality of the first plurality of tracks on the disk each includes third and fourth servo bursts defining a second plurality of different position offsets from the respective track reference lines, where the second plurality is no greater than the first plurality. The method further includes reading a second plurality of position error signals at the respective second plurality of different position offsets, positioning the read element of the transducer at the track reference line of a track, and obtaining a position error signal based on the predetermined offset, at least one of said second plurality of different position offsets, and at least one of said second plurality of position error signals. The method uses the position error signal to move the read element of the transducer to an off-reference line position for reading information.

DETAILED DESCRIPTION

The present invention comprises a method, apparatus, and computer program product for linearizing a position error signal of a transducer in a hard disk drive. In one embodiment, a method includes providing a disk that includes a first plurality of tracks each having first and second servo bursts defining a track reference line of the respective tracks. A second plurality of the first plurality of tracks on the disk each includes third and fourth servo bursts defining a second plurality of different position offsets from the respective track reference lines, where the second plurality is no greater than the first plurality. The method further includes reading a second plurality of position error signals at the respective second plurality of different position offsets, positioning the read element of the transducer at the track reference line of a track, and obtaining a position error signal based on the predetermined offset, at least one of said second plurality of different position offsets, and at least one of said second plurality of position error signals. The method uses the position error signal to move the read element of the transducer to an off-reference line position for reading information.

Figure 1:
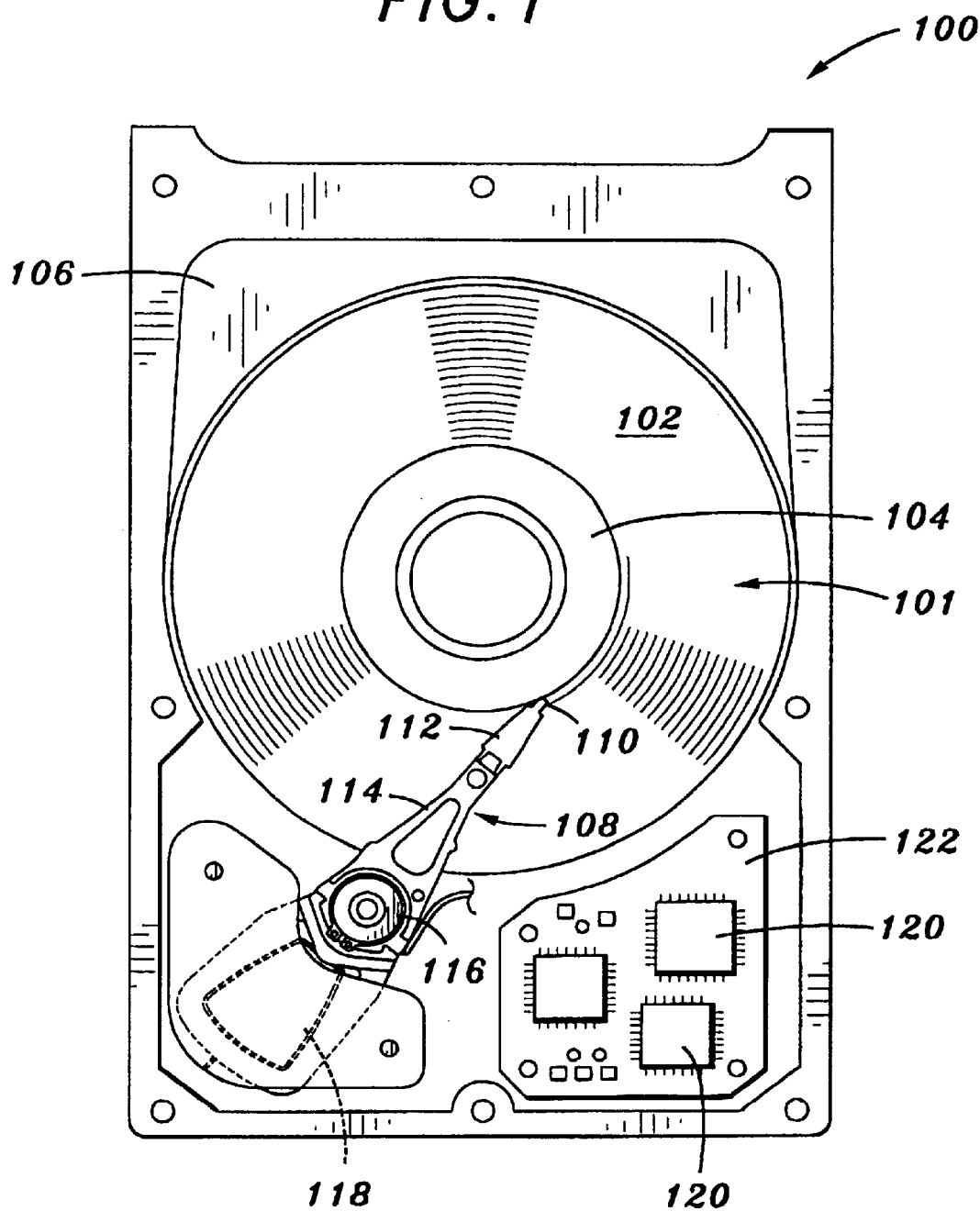
FIG. 1 is a top view of an exemplary embodiment of a hard disk drive.

Referring to the drawings more particularly by reference numbers, FIG. 1 shows an embodiment of a hard disk drive 100. The disk drive 100 includes at least one magnetic disk 101 that is rotated by a spin motor 104. The spin motor 104 is mounted to a base plate 106. Also mounted to the base plate 106 is an actuator arm assembly 108. The actuator arm assembly 108 includes a number of heads having transducers 110 mounted to corresponding flexure arms 112. The flexure arms 112 are attached to an actuator arm 114 that can rotate about a bearing assembly 116. The assembly 108 also contains a voice coil motor 118 which moves the heads 110 relative to the disk 101. There is typically a single transducer for each disk surface. The transducer writes information to and reads information from the rotating disk 101 by magnetizing and sensing, respectively, the magnetic field of the disk 12. Providing a current to the voice coil 118 will generate a torque that rotates the actuator arm 114 about the bearing assembly 116. Rotation of the actuator arm 114 will move the transducer 110 across the disk surface 102. The spin motor 104, voice coil motor 118, and the heads 110 are coupled to an electronic circuit 120 mounted to a printed circuit board 122. In the following discussion, only one head 110 is referenced.

Information is typically stored within annular tracks of the disk 101. Each track typically contains a plurality of sectors. Each sector may include a data field and an identification field. The identification field may contain Gray code information which identifies the sector and track (cylinder). The transducer 110 is moved across the disk surface 102 to write or read information on a different track. Moving the transducer to access a different track is commonly referred to as a seek routine.

Figure 2:
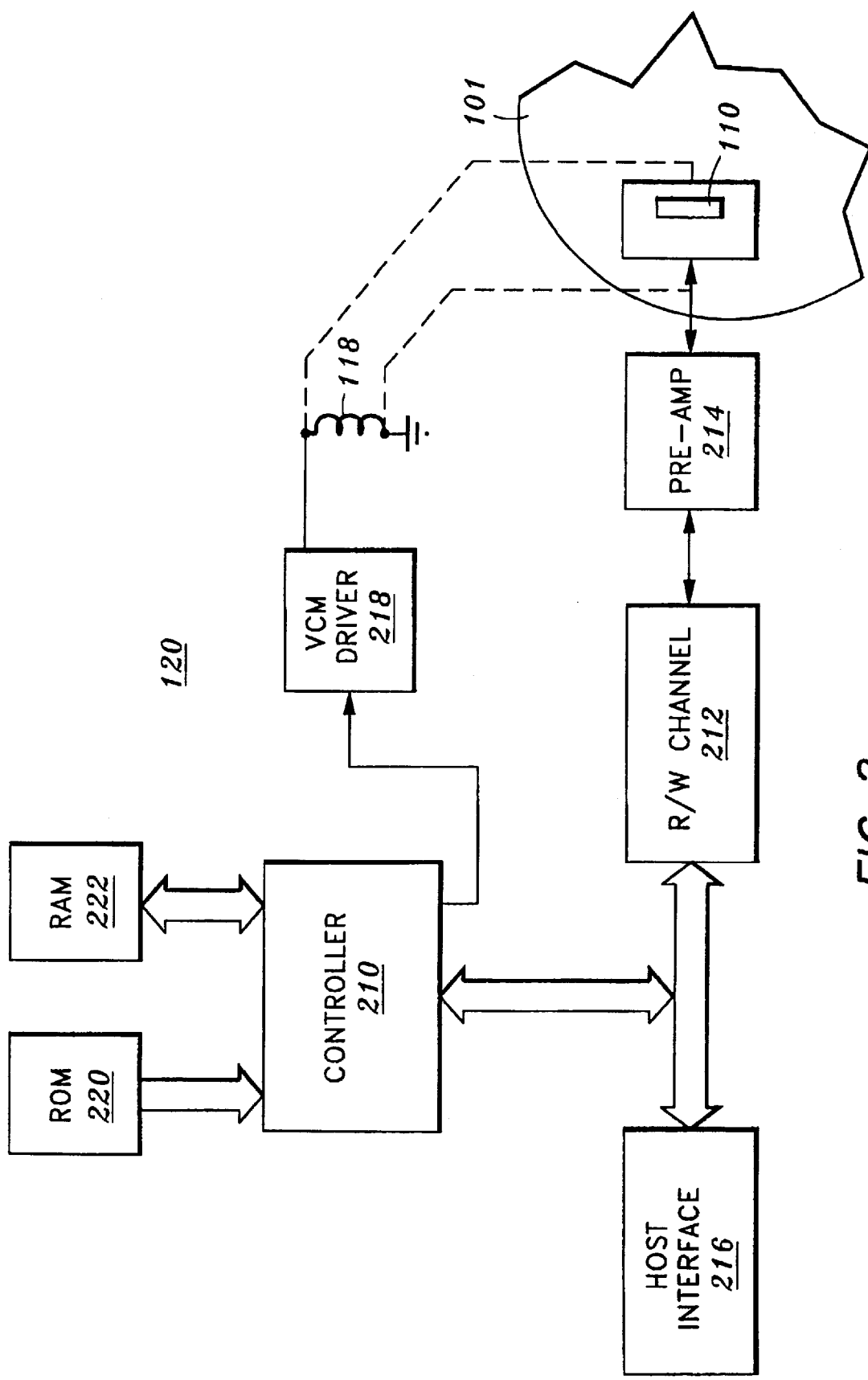
FIG. 2 is an exemplary block diagram of an electrical system for controlling the hard disk drive of FIG. 1.

FIG. 2 is an exemplary block diagram of an electrical circuit 120 for controlling the hard disk drive 100 of FIG. 1. The circuit 100 includes a controller 210 that is coupled to the transducer 110 by a read/write (R/W) channel circuit 212 and a pre-amplifier circuit 214. The controller 210 may be a digital signal processor (DSP), microprocessor, microcontroller, ASIC, gate array, and the like. The controller 210 provides control signals to the read/write channel 212 to read information from the disk 101 or write information to the disk 101. The information is typically transferred from the R/W channel 212 to a host interface circuit 216. The host circuit 216 may include buffer memory and control circuitry which allow the disk drive to interface with a system such as a personal computer.

The controller 210 may also be coupled to a VCM driver circuit 218 which provides a driving current to the voice coil 118. The controller 210 provides control signals to the driver circuit 218 to control the excitation of the VCM and the movement of the transducer 110.

The controller 210 is also coupled to a non-volatile memory such as a read only memory (ROM) or flash memory device 220, and a random access memory (RAM) device 222. The memory devices 220 and 222 contain instructions, data, and software routines that are used by the controller 210. One of the software routines includes a seek routine to move the transducer 110 from one track to another track. The seek routine may include a servo control routine to insure that the transducer 110 moves to the correct track. In one embodiment, the memory device 220 contains the acceleration, velocity, and position trajectory equations, where such equations may be loaded into memory device 222 at startup. The memory device 220 also contains a routine to linearize the position error signal of the read/write head transducer, where the routine is loaded into memory device 222 at startup.

When reading the servo information located in the servo field region on the disk 101, the head 110 generates a read signal that corresponds to the magnetic field of the disk 102. The read signal is amplified by the amplifier 214 and provided to the R/W channel circuit 212. The R/W channel circuit 212 detects the amplitude of the read signal. The read signal is then provided to the controller 210 which provides digitized samples of the analog read signal. The controller 210 then generates a position offset signals based on the servo information read by the head 110. The values representing the position offset signals are stored in memory 222.

Figure 3:
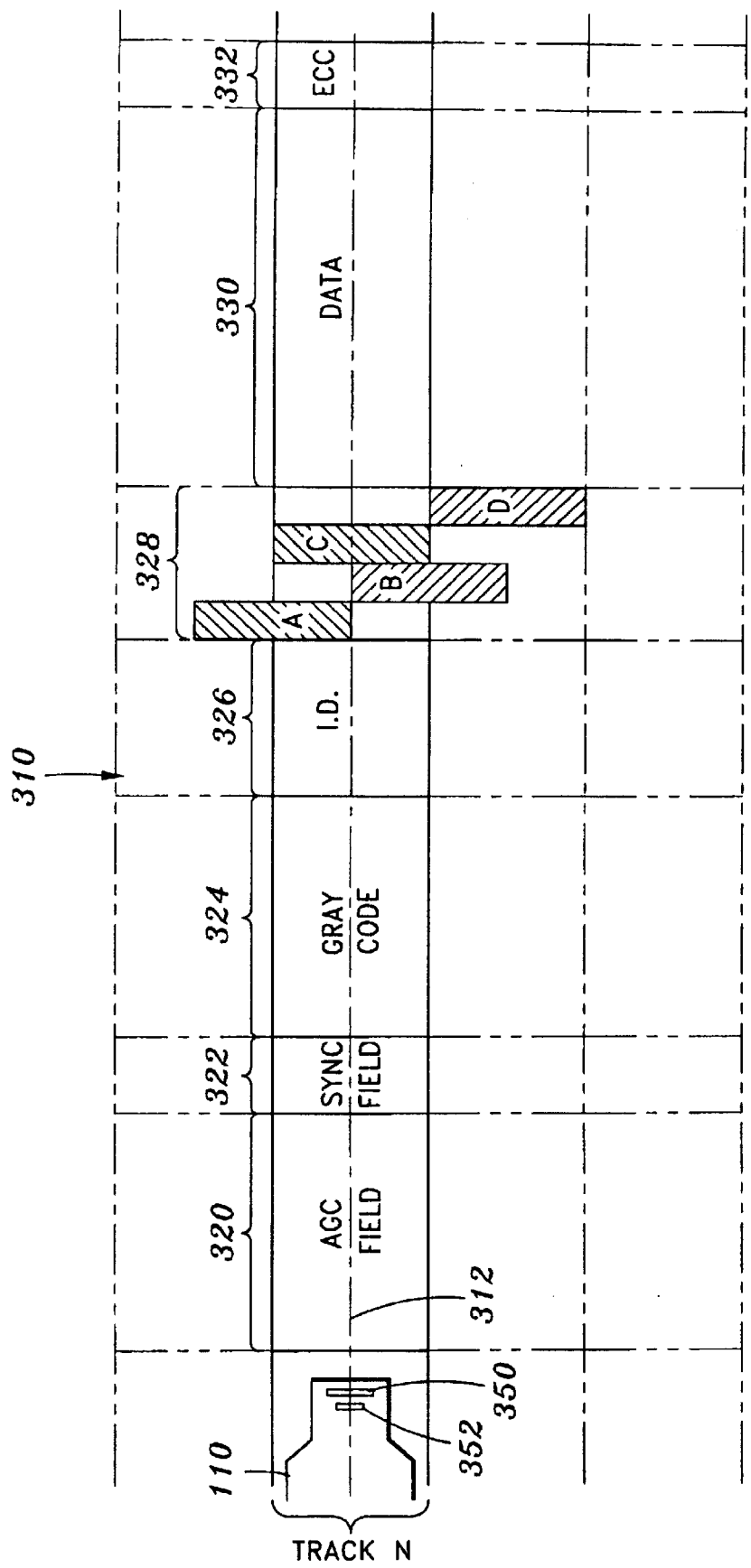
FIG. 3 illustrates a data sector of a disk.

FIG. 3 shows an arrangement of the information stored within sectors of radially concentric tracks located across the disk 101. Note that information may be arranged according to a multitude of protocols. The present invention is equally applicable to every arrangement. Consequently, the arrangement of the information is for exemplary purposes only and not intended as a limitation.

Referring to FIG. 3, a sector 310 includes an automatic gain control (AGC) field 320, a synchronization (sync) field 322, a gray code field 324 that identifies the track, an identification (ID) field 326 that defines the sector, a servo field 328 which includes a number of servo bits A, B, C, and D, a data field 330 which contains the data, and an error correction code field 332. The circuit 200 utilizes the servo bits A, B, C and D to maintain the head 110 on the centerline (or reference line) 312 of the track N. Note that a track reference line is not necessarily a centerline of the track.

The head 110 can magnetize and sense the magnetic field of the disk 101. In one embodiment, the head 110 has a write element 350 and a separate read element 352. In one embodiment, the read element 352 is constructed from a magneto-resistive material which changes resistance in proportion to the intensity of an external magnetic field. The read element 352 is sometimes offset from the write element 350 because of the tolerances associated with the manufacturing process of the head 110. Additionally, the center of the read element 352 may be offset from the center of the write element 350 because of the skew angle of the head 110 with respect to the track on the disk 101. If the read element 352 is aligned with the centerline 312 of the track N, and the write element 350 is offset from the read element 352, the data will be written off-center from the centerline 312 of the track N. To properly read the data, the read element 352 must be moved over to the off-center location of the written data. To move the read element 352 to the off-center location of the written data, the circuit 200 generates a position error signal (PES) which has a voltage amplitude that varies with the distance that the head 110 is off-set from the track centerline 312.

Figure 4:
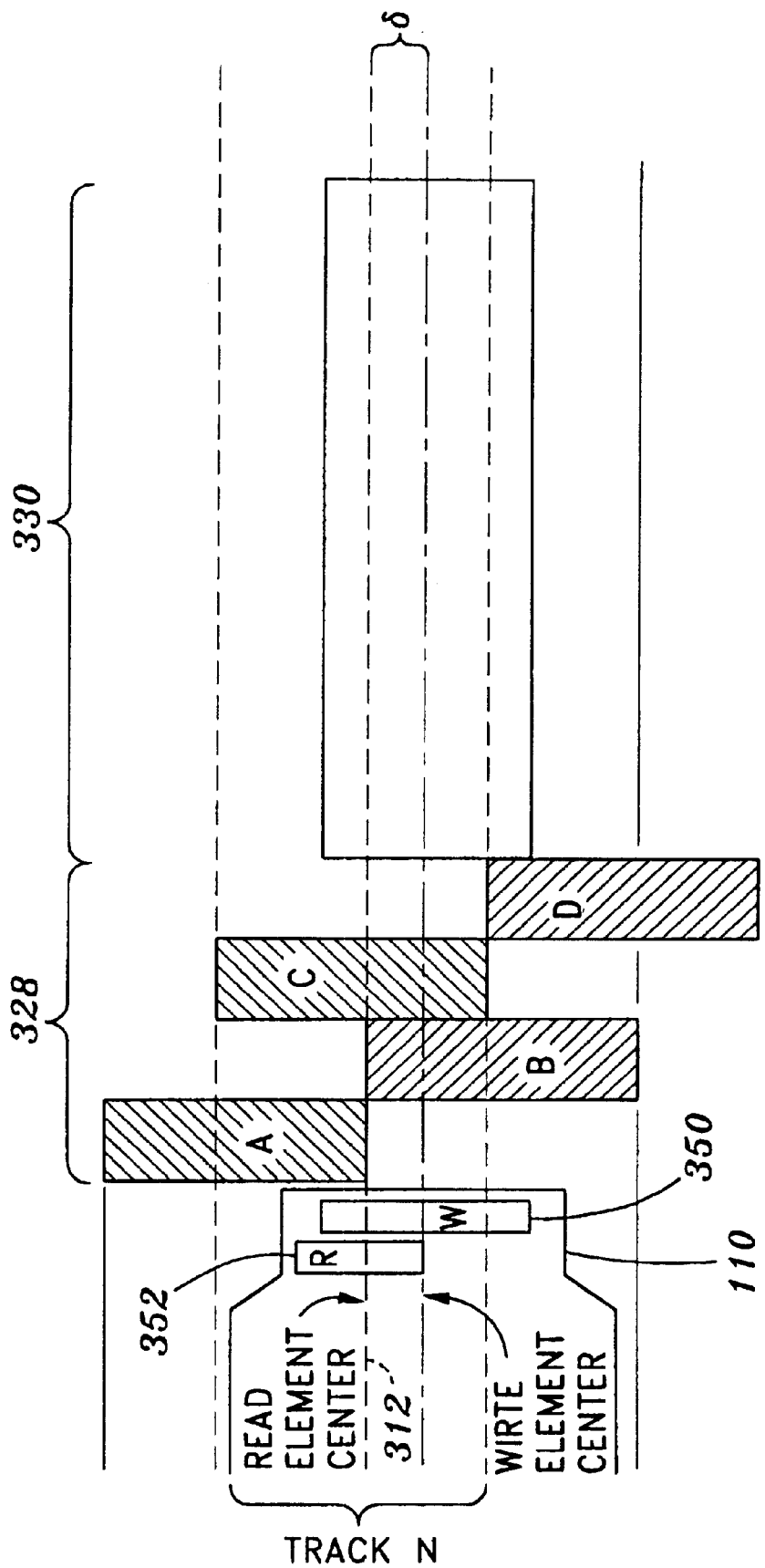
FIG. 4 is an expanded view of a portion of the data sector of FIG. 3.

FIG. 4 is an expanded view of a portion of the data sector 310 of FIG. 3. As mentioned before, the servo field 328 in each sector contains a number of servo bits designated A, B, C and D. The boundary formed by servo bursts A and B defines a track centerline 312 of the track N. The centerline of servo burst C is aligned with the centerline 312 of the track N. The servo burst D is offset 180 degrees from the position of the servo burst C. The servo bursts A and B are used to center the read element 352 with the centerline 312 of the track N where the value of A–B (A minus B) corresponds to the off-track position of the head 110 if A–B is a non-zero value. This is accomplished by detecting the amplitude of the servo bursts A, B, C and D using the read element 352 of the head 110. If the center of the read element 352 is not aligned with the center of the write element 350 (and thus, the center of the written data), then the controller 210 (FIG. 2) will generate a position error signal to move the head 110 so that alignment of the center of the read element 352 with the center of the written data in the data field 330 may be accomplished.

The distance that the head 110 has to be moved in such a situation is determined by the offset between the read element 352 and the write element 350 for a particular track. In order to write data in the data field 330, the read element is first centered with the track centerline 312, which is the null position between servo bursts A and B (where A–B=0). The write element 350 is then used to write data in the data field 330. The centerline of the written data is the centerline of the write element 350, which is offset from the centerline 312 of track N by a distance δ. The value of δ may vary from one track to another due to skew angle and other potential factors.

Figure 5:
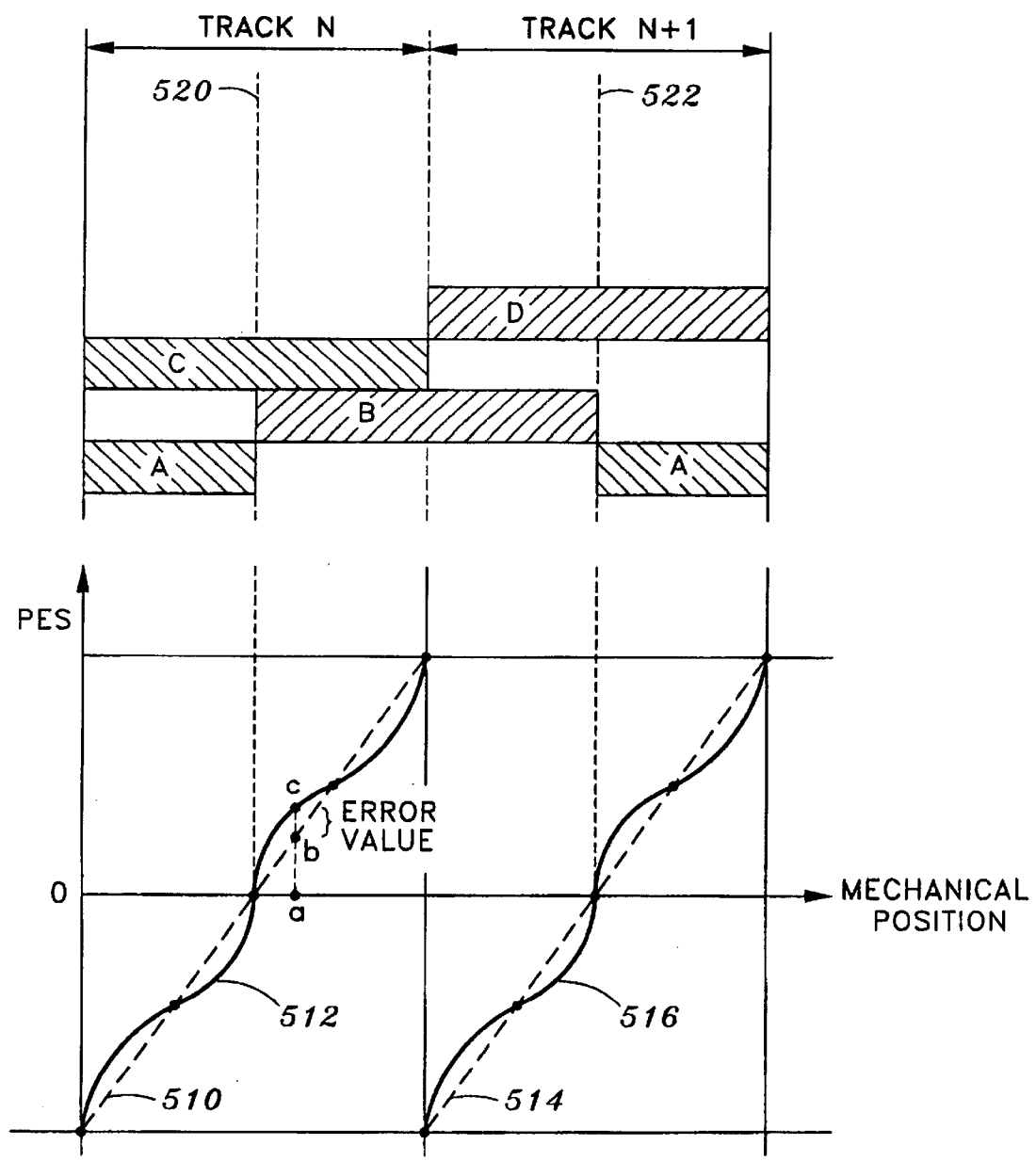
FIG. 5 illustrates a graph of a position error signal.

FIG. 5 shows a graph of a position error signal (PES) versus the mechanical position of the head on a track. The PESs in disk drives are derived from the burst patterns A, B, C, and D written by a precision servo track writer (STW), at fixed offsets from the track centerline. The STW can typically place the positions of the burst patterns A, B, C, and D within 1% accuracy. For data writing, the read element is first positioned on the track where the signal amplitude of burst A is the same as the signal amplitude of burst B, which in this embodiment is the centerline of the track, and then data is written onto the disk. For reading, the read element is positioned based on the relative offset between the read and write elements, which can be some offset from the track centerline depending on the track location. PES linearity may vary, and, in some instances substantially, with the ratio of read width to the servo burst width. When the ratio becomes small (e.g., under 50%), linearity can vary substantially to affect real mechanical positioning integrity, servo stability, and drive performance. PES non-linearity may be further exasperated by head to track pitch ratio.

Referring to FIG. 5, the dashed line 510 shows the ideal PES for track N, while dashed line 514 shows the ideal PES for track N+1. As can be seen, the ideal PESs 510 and 514 are linear and zero where the magnitude of burst A is equal to the magnitude of burst B. In the current embodiment, this occurs at the centerline 520 of track N and the centerline 522 of track N+1. The actual PESs for tracks N and N+1 are shown by curves 512 and 516, which are non-linear. From FIG. 5 it is clear that the null position of the PES (e.g., track centerline 520 of track N and track centerline 522 of track N+1) has the highest mechanical positioning integrity. Offsetting from the null PES position introduces substantial non-linear uncertainty to the PES signal. For example, as the head is moved from the null PES to position "a" to the right of the track centerline 520, the difference between the actual PES "c" and the ideal PES "b" is the error value, which may be substantial to decrease drive performance.

Figure 6:
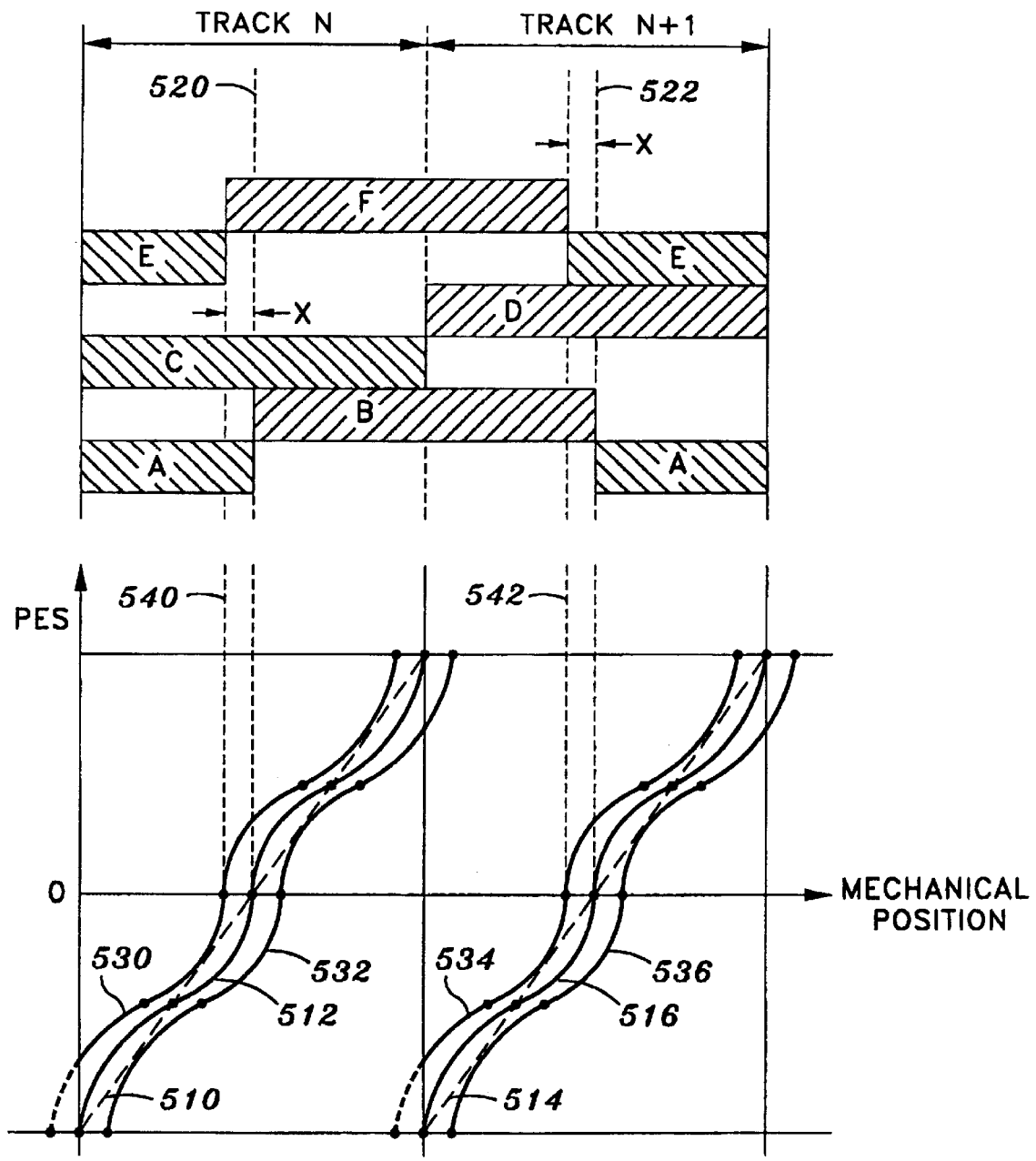
FIG. 6 illustrates a portion of the data sector and a graph showing the position error signal.
Figure 7:
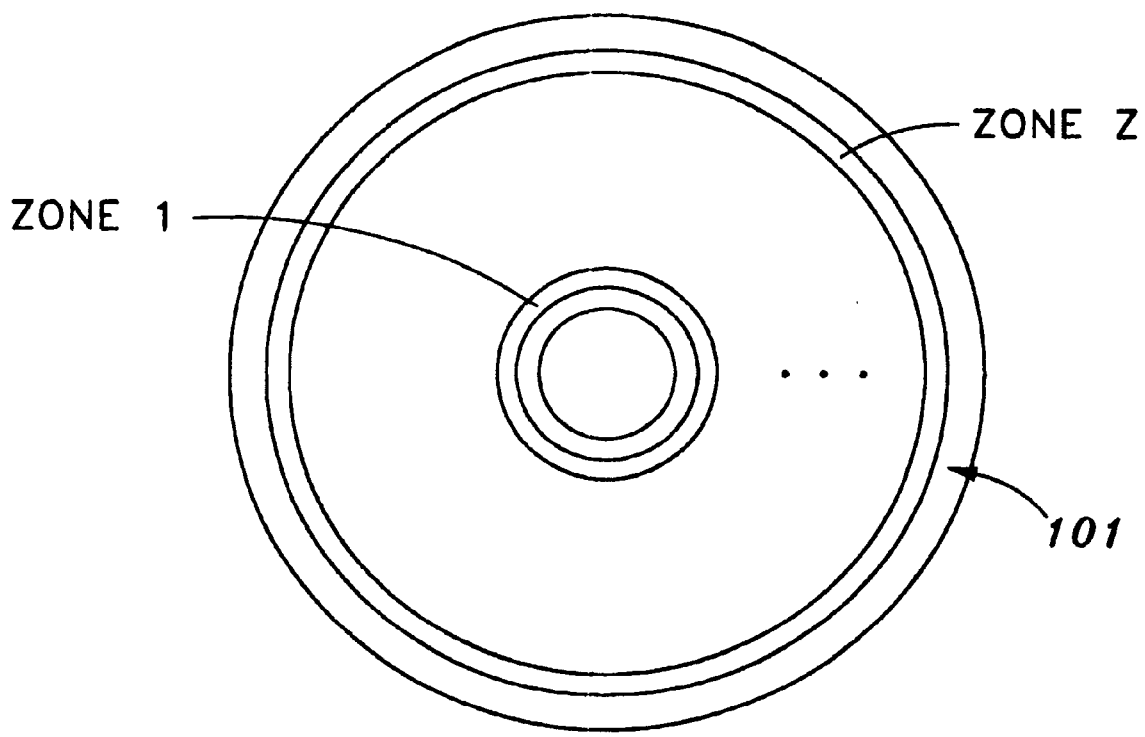
FIG. 7 shows an arrangement of the disk.

FIG. 6 illustrates a portion of the data sector and a graph showing the position error signal. FIG. 7 shows an arrangement of the disk 101. Referring to FIGS. 6 and 7, selected sectors and/or tracks on the disk 101 are written with additional servo bursts E and F during the servo writing process. In one embodiment, the disk 101 is divided into annular zones 1 to Z, where a plurality of sectors and/or tracks in each zone is written with the additional servo bursts E and F. While in one embodiment, the disk 101 is broken up into annular zones, the disk 101 may be broken up in a different arrangement such as, for example, into Z pie slices. For sake of illustration and not a restriction, the disk 101 is broken up into twelve (12) annular zones, and each zone includes twenty (20) sectors and/or tracks each including the additional servo bursts E and F. The boundary formed by the servo bursts E and F for each sector and/or track in each zone is written at a different offset from the track centerline. Continuing with the exemplary embodiment, in a first sector for a zone, the boundary formed by servo bursts E and F is written at a 5% offset (e.g., 5% of the entire width of a track) from the track centerline, in a second sector for the zone, the boundary formed by servo bursts E and F are written at a 10% offset from the track centerline, and so on. The number of zones, number of sectors and/or tracks in each zone that are written with the E and F bursts, and the granularity of offsets are a matter of design choice, and the values illustrated herein is provided only as an illustration.

Referring to FIG. 6, for track N, the boundary formed by bursts E and F is written at an X% offset from the track centerline 520. Depending on the offset used to write the bursts E and F, the PES derived from them has null offset from the null position of the PES derived from bursts A and B. The null positions indicate true mechanical positions, to within precision servo writing accuracies.

For track N, the PES 530 corresponds to bursts E and F and has a null position $-X\%$ from the null position of the PES 512. Correspondingly, the PES 532 may correspond to bursts that have a null position $X\%$ (to the right of track centerline 520) from the null position of the PES 512.

By writing a plurality of bursts E and F at different offsets in each zone, a table of offsets and PES values can be created as follows:

TABLE 1

| ZONE   | E-F OFFSET | PES        |
|--------|------------|------------|
| Zone 1 | $X_0$      | $PES(X_0)$ |
| Zone 1 | ...        | ...        |
| Zone 1 | $X_N$      | $PES(X_N)$ |
| ...    | ...        | ...        |
| Zone Z | $X_0$      | $PES(X_0)$ |
| Zone Z | ...        | ...        |
| Zone Z | $X_N$      | $PES(X_N)$ |

Once the values in Table 1 are obtained, which may be during burn-in of the disk drive 100 in the factory, the values may be stored on the disk 101 at a location that cannot be written over (e.g., system cylinders on disk). The values may also be stored in the non-volatile memory device 220. At startup, the values are loaded into the memory device 222.

Additionally, during burn-in test of the disk 100 in the factory, the read/write element offsets are calibrated over the Z zones. That is, for each zone, the read/write offset between the read and write elements is determined in terms of X (the mechanical position) and stored in a table. Table 2 is an exemplary table of the read/write offsets.

TABLE 2

| ZONE   | READ/WRITE OFFSET |
|--------|-------------------|
| Zone 1 | $X_{R/W-Zone\ 1}$ |
| ...    | ...               |
| Zone Z | $X_{R/W-Zone\ Z}$ |

The read/write offset values in zones 1 to Z may be stored on the disk 101 (e.g., system cylinders) or in memory device 220. At startup, the values in Table 2 may be loaded into memory device 222.

During reading of data from a desired track, the routine determines the zone that the desired track is located in, and obtains the read/write offset $X_{R/W}$ from Table 2. Then, the routine looks into Table 1, matches the read/write offset $X_{R/W}$ with the E-F offset value in the zone, and determines the PES. If the read/write offset $X_{R/W}$ is not equal to an E-F offset value, the routine may use a linearization technique to determine the correct PES value.

Different techniques may be used to linearize a set of offsets and corresponding PESs. According to one embodiment, a PES may be linearized based on linear interpolation. Thus:

If, $$PES(X_{I-1}) < PES(X) < PES(X_I), \qquad (1)$$

then $$PES_{Linear} = X_{I-1} + \frac{PES(X) - PES(X_{I-1})}{PES(X_I) - PES(X_{I-1})}(X_I - X_{I-1}). \qquad (2)$$

Figure 8:
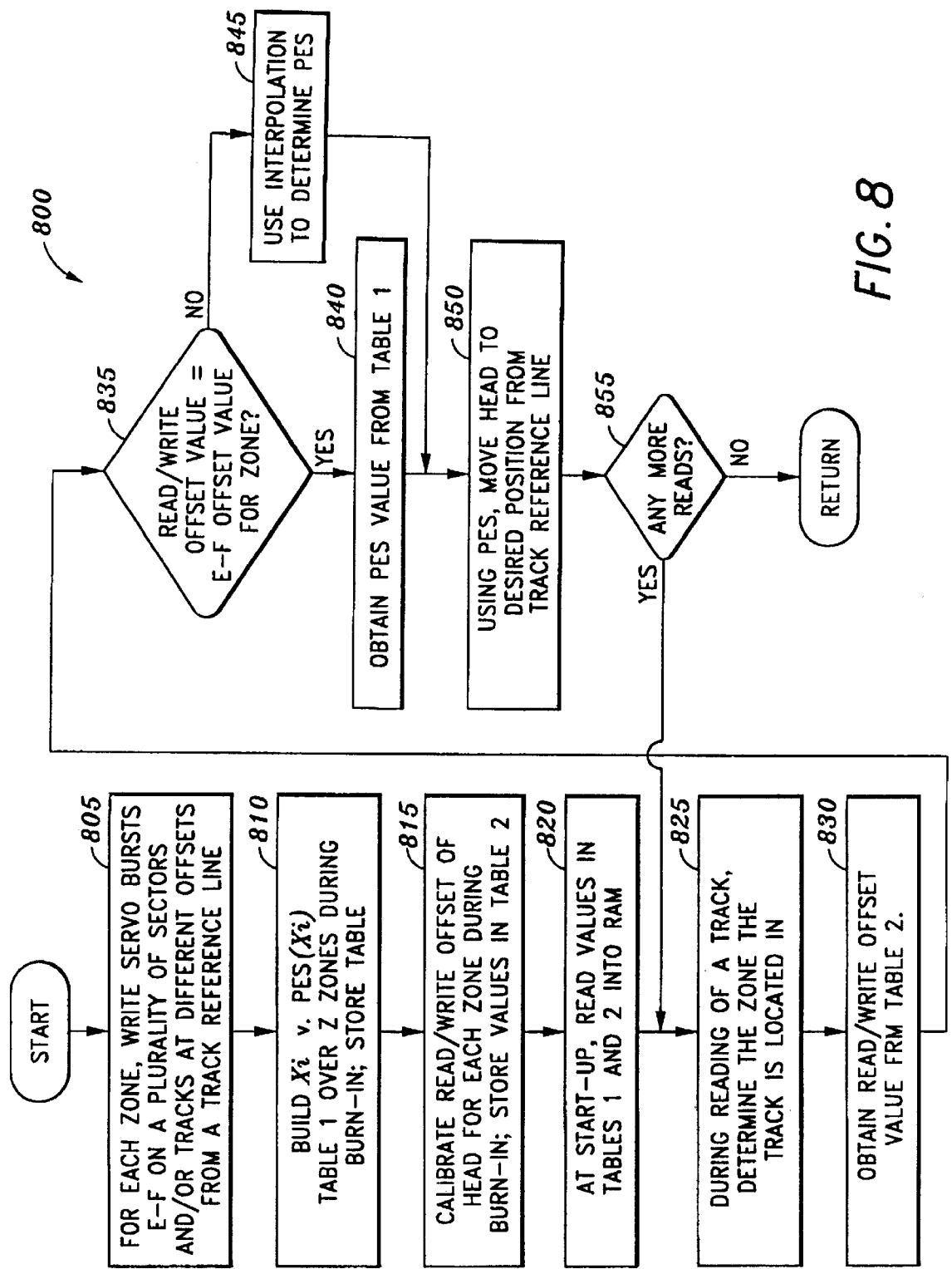
FIG. 8 is a flow diagram of a process, according to one embodiment of the present invention.

FIG. 8 is a flow diagram of a process 800, according to one embodiment of the present invention. The process 800 may be implemented as a software routine, subroutine, driver, module, program, etc., and/or combinations thereof.

Referring to FIG. 8, the process 800 commences at block 805 where servo bursts E and F are written with a STW on a plurality of sectors and/or tracks for each zone. For example, if there are twelve (12) zones and twenty (20) tracks that include servo bursts E and F, then a total of two hundred forty (240) tracks on the disk are written with the servo bursts E and F. In one embodiment, bursts E and F are written during the time of writing of servo bursts A, B, C, and D. For each zone, the boundaries formed by the plurality of servo bursts E and F written on the disk are at different offsets from the track centerline (or reference line). Note that the plurality of different offsets do not have to be spaced apart at progressively equal offsets. That is, in a zone, the difference between offsets $X_1$ and $X_2$ may be different than the difference between offsets $X_3$ and $X_4$.

At block 810, a table similar to Table 1 is created. The table includes a plurality of zones, and a plurality of Xi versus PES(Xi) values for each zone. The table may be stored on the disk 101 or in ROM 220. Note that at this time, the bursts E and F written by the STW may be erased and used for data, as the E and F bursts are no longer needed. At block 815, the process calibrates read/write offset of the head for each zone, and stores the values in a table similar to Table 2. The table may be stored on the disk 101 or in ROM 220. Note that the execution of blocks 810 and 815 may be reversed.

Continuing to refer to FIG. 8, when the drive 100 is started, as part of the initialization process, Tables 1 and 2 are loaded into RAM 222 (block 820). During reading of a track, the software routine determined which zone the track is located in (block 825). A table of zone versus tracks may be stored on the disk 101 or in ROM 220. The process 800 interrogates Table 2 to determine the read/write offset of the head for the zone (block 830). The process 800 then determines, for the particular zone, whether the read/write offset matches an E-F offset value (block 835). If there is a match, the process moves to block 840 where the PES value matching the E-F offset value is obtained. If, at block 835, the read/write offset does not match an E-F offset value in Table 1, the process moves to block 845 where interpolation may be used to determine the value of PES. In one embodiment, linear interpolation, as defined by equations (1) and (2), may be used. The process 800 then moves to block 850 where the head is moved from the track centerline (or reference line) until the PES value read from the servo bursts A and B equals or substantially equals the PES obtained (from block 840 or block 845). For each read, blocks 825 to 850 may be executed to align the center of the read element with the center of the written data.

The present invention may be implemented as a method, apparatus, system, computer program product, etc. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method in a hard disk drive for linearizing a position error signal of a transducer having a read element and a write element that is offset from the read element by a predetermined offset, comprising:

providing a disk including a first plurality of tracks each having first and second servo bursts defining a track reference line of the respective tracks, a second plurality of the first plurality of tracks each including third and fourth servo bursts defining a second plurality of different position offsets from the respective track reference lines, the second plurality being no greater than the first plurality;

reading a second plurality of position error signals at the respective second plurality of different position offsets;

positioning the read element of the transducer at the track reference line of a track;

obtaining a position error signal based on the predetermined offset, at least one of said second plurality of different position offsets, and at least one of said second plurality of position error signals; and using the position error signal to move the read element of the transducer to an off-reference line position for reading information.

2. The method of claim 1 wherein the off-reference line position is substantially a centerline of the write element of the transducer.

3. The method of claim 1 wherein the track reference line comprises a track centerline.

4. The method of claim 1 further comprising storing on the disk the predetermined offset, the second plurality of different position offsets, and the second plurality of position error signals.

5. The method of claim 1 wherein obtaining comprises:

determining whether the predetermined offset is substantially equal to one of the second plurality of different position offsets;

if so, obtaining the position error signal corresponding to the one of the second plurality of different offset positions that is substantially equal to the predetermined offset;

if not, using interpolation to obtain the position error signal that corresponds to the predetermined offset.

6. The method of claim 1, wherein providing comprises providing the disk divided into a third plurality of zone each including the first plurality of tracks each having first and second servo bursts defining a track reference line of the respective tracks, the second plurality of the first plurality of tracks in each zone each including third and fourth servo bursts defining the second plurality of different position offsets from the respective track reference lines, the second plurality being no greater than the first plurality;

for each zone, determining a predetermined offset between the read and write elements;

storing a third plurality of predetermined offsets;

wherein reading comprises reading, for each zone, a second plurality of position error signals at the respective second plurality of different position offsets;

obtaining the predetermined offset between the read and write elements of the transducer for the zone that the track is located in; and wherein obtaining comprises obtaining the position error signal based on (i) the predetermined offset, (ii) at least one of said second plurality of different position offsets, and (iii) at least one of said second plurality of position error signals, for the zone that the track is located in.

7. The method of claim 6 further comprising storing on the disk the third plurality of predetermined offsets, the second plurality of different position offsets, and the second plurality of position error signals.

8. A disk for a hard disk drive, comprising:

a disk including a first plurality of tracks each including first and second servo bursts defining a track reference line, a second plurality of the first plurality of tracks on the disk each including third and fourth servo bursts defining a second plurality of different position offsets from the track reference line of the second plurality of tracks, each of said second plurality of different position offsets being at a different value than any other position offset, said second plurality being no greater than the first plurality, said second plurality of different position offsets for linearizing a position error signal.

9. The disk of claim 8, wherein the track reference line comprises a track centerline.

10. The disk of claim 8, wherein said disk further including one or more tracks storing the second plurality of different position offsets and a second plurality of position error signals at the corresponding second plurality of different position offsets.

11. The disk of claim 8, wherein said disk being divided into a third plurality of zones, said disk including, for each zone, a first plurality of tracks each including first and second servo bursts defining a track reference line, a second plurality of the first plurality of tracks for each zone each including third and fourth servo bursts defining the second plurality of different position offsets from the track reference line of the second plurality of tracks, each of said second plurality of different position offsets being at a different value than any other position offset, said second plurality being no greater than the first plurality, said second plurality of different position offsets for linearizing the position error signal.

12. The disk of claim 11, wherein said disk further including one or more tracks storing (i) the second plurality of different position offsets for each zone, (ii) a second plurality of position error signals at the corresponding second plurality of different position offsets for each zone, and (iii) a head offset position for each zone, said head offset position being defined as the offset between the read and write elements of a head.

13. A hard disk drive, comprising:

a housing;

a spin motor mounted to said housing;

an actuator arm mounted to said spin motor;

a disk attached to said spin motor, said disk including a first plurality of tracks each including first and second servo bursts defining a track reference line, a second plurality of the first plurality of tracks on the disk each including third and fourth servo bursts defining a second plurality of different position offsets from the track reference line of the second plurality of tracks, each of said second plurality of different position offsets being at a different value than any other position offset, said second plurality being no greater than the first plurality, said second plurality of different position offsets for linearizing a position error signal; and a read/write head mounted to said actuator arm for reading said disk.

14. The disk of claim 13, wherein the track reference line comprises a track centerline.

15. The disk of claim 13, wherein said disk further including one or more tracks including the second plurality of different position offsets and a second plurality of position error signals at the corresponding second plurality of different position offsets.

16. The disk of claim 13, wherein said disk being divided into a third plurality of zones, said disk including, for each zone, a first plurality of tracks each including first and second servo bursts defining a track reference line, a second plurality of the first plurality of tracks for each zone each including third and fourth servo bursts defining the second plurality of different position offsets from the track reference line of the second plurality of tracks, each of said second plurality of different position offsets being at a different value than any other position offset, said second plurality being no greater than the first plurality, said second plurality of different position offsets for linearizing the position error signal.

17. The disk of claim 16, wherein said disk further including one or more tracks including (i) the second plurality of different position offsets for each zone, (ii) a second plurality of position error signals at the corresponding second plurality of different position offsets for each zone, and (iii) a head offset position for each zone, said head offset position being defined as the offset between the read and write elements of the read/write head.

18. A computer program product, comprising:

a computer usable medium having computer readable program code embodied therein to linearize a position error signal of a head having a read element and a write element in a hard disk drive having a disk that includes one or more track including a head offset value defined as the distance between the read and write element of the head, a plurality of different position offset values each measured from a track reference line, and a plurality of position error signals at the corresponding plurality of different position offset values, the computer readable program code in said computer program product comprising:

first computer readable program code to read the head offset value from the disk;

second computer readable program code to obtain a position error signal that corresponds to one of the plurality of different position offset values that is closest in value to the head offset value;

third computer readable program code to position the head on a track reference line of a track; and fourth computer readable program code to move the head from the track reference line until a measured position error signal read from the disk is substantially equal to the position error signal.

19. The computer program product of claim 18, wherein the track reference line comprises a track centerline.

20. The computer program product of claim 18, further comprising:

computer readable program code to write first and second servo bursts on a plurality of tracks of the disk to define a track reference line;

computer readable program code to write third and fourth servo bursts on at most the plurality of tracks of the disk at different offsets from to track reference line to define a second plurality of different position offset values;

computer readable program code to read a second plurality of position error signals from the disk at the corresponding second plurality of different position offset values; and computer readable program code to store the second plurality of different position offset values and the second plurality of position error signals.

* * * * *